(No Model.)
G. J. CLINE.
WIRE TIGHTENER.
No. 505,029. Patented Sept. 12, 1893.
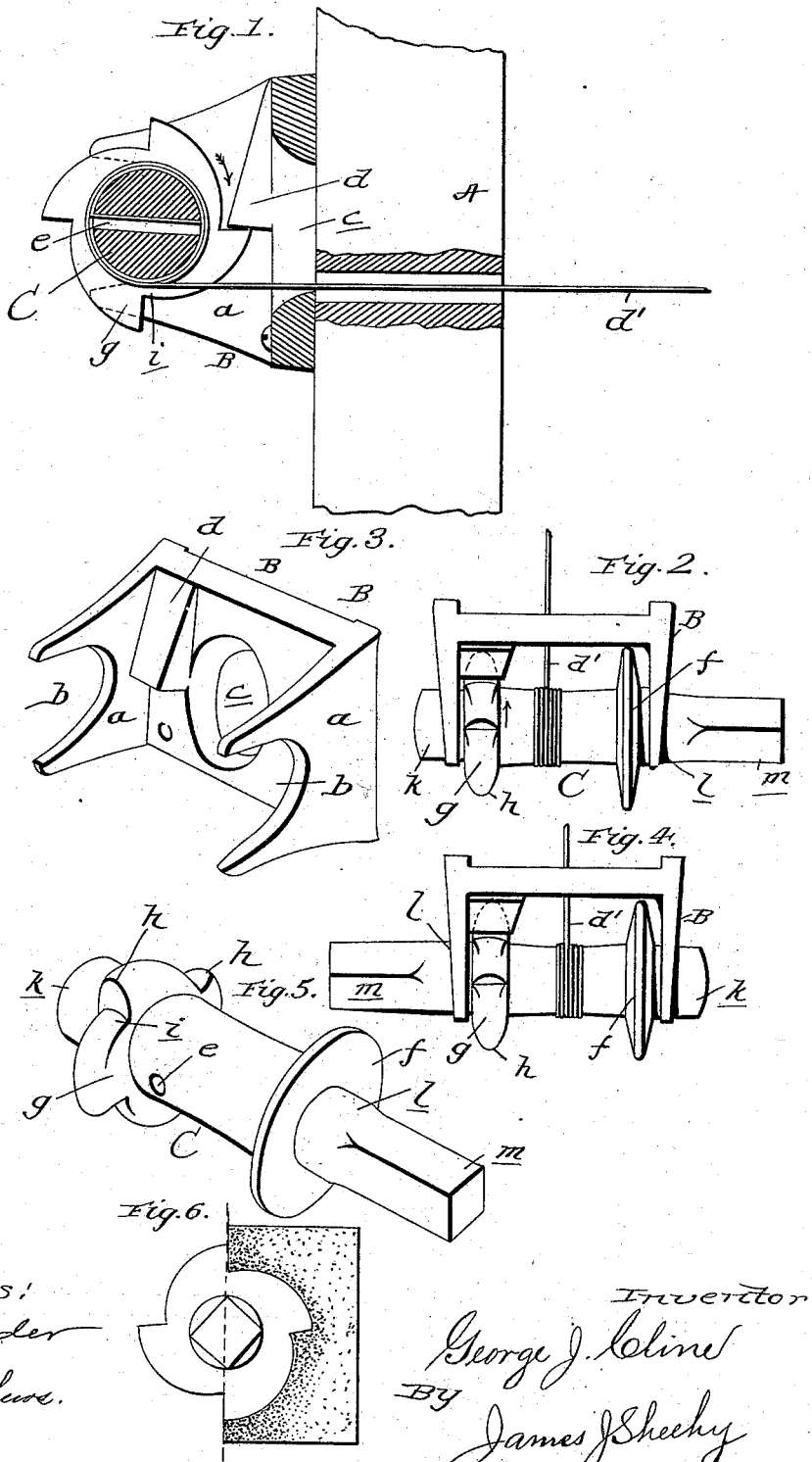
Witnesses:
C. H. Raeder
N. F. Matthews.
Inventor
George J. Cline
By
James J. Sheehy
Attorneys.

United States Patent Office.

GEORGE J. CLINE, OF GOSHEN, INDIANA.

WIRE-TIGHTENER.

SPECIFICATION forming part of Letters Patent No. 505,029, dated September 12, 1893.

Application filed June 7, 1893. Serial No. 476,847. (No model.)

*To all whom it may concern:*

Be it known that I, GEORGE J. CLINE, a citizen of the United States, residing at Goshen, in the county of Elkhart and State of Indiana, have invented certain new and useful Improvements in Wire-Tighteners; and I do declare the following to be a full, clear, and exact description of the invention, such as will enable others skilled in the art to which it appertains to make and use the same.

This invention has relation to an improvement in wire tighteners, as used upon wire fences, and other places, and the novelty will be fully understood from the following description and claim when taken in connection with the annexed drawings, in which—

Figure 1, is a view of a portion of a fence post, illustrating my improvements in connection therewith, and in section, with a wire in position. Fig. 2, is a plan view of the tightener, and a part of a wire removed from the post. Fig. 3, is a perspective view of the block or bearing for the tightening spools. Fig. 4, is a plan view, illustrating the ratchet and lock on the opposite side from that shown in Fig. 2, for the purpose of showing that the spools may be used right and left. Fig. 5, is a perspective view of one of the spools removed from the box or bearing; and Fig. 6 is an end view of the spool shaft and ratchet, showing one half thereof in the sand; the dotted line indicating the point at which the spool is divided in casting, for the purpose of showing how each half can be drawn sidewise from the same.

Before describing the details of construction, I would say that I am well aware that it is very old to provide a box or bearing for tightening spools as used on wire fences, and that such bearings have been provided with beveled lugs for the purpose of engaging ratchet teeth fixed to the spool shafts, but these devices have been found both expensive and objectionable for the reason that they are difficult to cast and ineffective in operation, in that they allow the spools to slip or turn, and the wires to slacken, and furthermore have been known to allow the spools to slip out of or remain loose in their bearings.

The object of my invention is to overcome these difficulties and produce a device at a minimum expense, which owing to the shape of the teeth, will be very effective for the purposes designed and may be easily cast.

Referring by letter to said drawings: A, indicates a part of a fence post which may be of any ordinary or approved construction.

B, indicates a box or bearing for one of the tightening spools. This box is provided with two parallel branches $a$, having curvilinear notches $b$, which are designed to receive and seat the spools. The box is furthermore provided in its base with a central aperture $c$, and on one side of said aperture is an incline or wedge shaped lug $d$, which tapers from a point about the longitudinal center of the box, to one of the longitudinal edges as better shown in Fig. 3, of the drawings.

C, indicates one of the tightening spools. This spool is provided at a suitable point in its length with a transverse hole or aperture $e$, to receive one end of the wire $d'$, as it passes through the aperture $c$, in the box or bearing. On one side of this apertured portion of the spool is an integral annular flange $f$, and at a suitable distance on the opposite side of said aperture, is a ratchet, which is also formed integral therewith, and comprises four teeth $g$. These teeth are of a peculiar construction so as to adapt the device to be conveniently cast in two parts, and one part drawn sidewise from the sand in opposite directions, as illustrated in Fig. 6, of the drawings. The teeth of this ratchet are rounded transversely on their outer sides throughout their length so as to avoid the formation of any angle and the outer ends of the teeth as at $h$, meet the heels $i$, of the contiguous tooth abruptly, or relatively at right angles so it will be seen that the respective teeth are thicker or broader at their base and taper on their sides longitudinally from the heel to the toe and are beveled transversely. This construction permits the production of a cast spool at a comparatively small expense. The shafts of the spools project on one side or outer side of the ratchet, at one end, as shown at $k$, to bear in one of the notches $b$, of the block or bearing, and the opposite end on the outer side of the flange $f$, is rounded as at $l$, to bear in the other notch $b$, and terminates in an angular portion or key-seat $m$, to receive a key, wrench, or other suitable implement, for turning the spool.

As it is desirable in some cases to have the wrench or key seat of the spool on the opposite side of the post, I provide spools with annular flanges adjacent the angular key seat portion, and place the ratchet adjacent the opposite end of the spool or spindle, as better shown in Fig. 4, of the drawings.

From the foregoing description when taken in connection with the accompanying drawings, the operation of my invention will be obvious. It will be seen that when the spool has been turned, the leverage will be gradual, starting at the heel of the tooth, until the point reaches the enlarged end of the lug, when the tooth will drop into the engagement with said lug, and firmly hold the wire upon the spool.

Having described my invention, what I claim is—

The improved spool for wire tightening devices consisting essentially of the round body having the integral annular flanges $f$, near one end, the ratchet also formed integral with the body and comprising the four teeth which taper on their longitudinal sides from the heels to the points and are rounded transversely throughout their length on their surface so as to avoid the formation of angles and produce a tooth broadest at its base, said teeth having their heels meeting the toes of the contiguous teeth in an abrupt or relatively right-angle, the body also having the journal portion $k$, at one end, the angular key seat $m$, at the opposite end, and the hole through the body between the flange and ratchet, in combination with the box or bearing having the beveled, angular lug in its base, the whole adapted to operate, substantially as specified.

In testimony whereof I affix my signature in presence of two witnesses.

GEORGE J. CLINE.

Witnesses:
WILSON ROOSE,
TURO K. ROMAINE.